United States Patent
Parker et al.

(10) Patent No.: US 6,771,748 B2
(45) Date of Patent: Aug. 3, 2004

(54) CONTROLLING CUSTOMIZED ANNOUNCEMENTS TO SUBSCRIBERS AND RESPONSES THERETO IN A TELECOMMUNICATION SYSTEM

(75) Inventors: David Gerard Parker, Swindon (GB); Mark Alexander Ristich, Plainfield, IL (US); Robin Jeffrey Thompson, Batavia, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 8 days.

(21) Appl. No.: 10/255,465

(22) Filed: Sep. 26, 2002

(65) Prior Publication Data

US 2004/0062366 A1 Apr. 1, 2004

(51) Int. Cl.[7] .............................................. H04M 1/64
(52) U.S. Cl. ............................. 379/88.16; 379/207.02; 379/221.09
(58) Field of Search ................ 379/88.16, 88.19–88.25, 379/201.01, 207.02, 207.03, 207.1, 207.15, 214.01, 220.01, 221.08–221.12

(56) References Cited

U.S. PATENT DOCUMENTS

| | | | | |
|---|---|---|---|---|
| 5,333,186 A | * | 7/1994 | Gupta | 379/114.09 |
| 5,428,670 A | * | 6/1995 | Gregorek et al. | 379/67.1 |
| 5,448,625 A | * | 9/1995 | Lederman | 379/88.25 |
| 5,652,784 A | * | 7/1997 | Blen et al. | 379/67.1 |
| 5,896,445 A | * | 4/1999 | Kay et al. | 379/135 |
| 5,937,037 A | * | 8/1999 | Kamel et al. | 379/88.19 |
| 6,009,150 A | * | 12/1999 | Kamel | 379/88.22 |
| 6,181,927 B1 | * | 1/2001 | Welling et al. | 455/414.1 |
| 6,212,262 B1 | * | 4/2001 | Kamel | 379/88.22 |
| 6,470,181 B1 | * | 10/2002 | Maxwell | 455/413 |
| 6,590,970 B1 | * | 7/2003 | Cai et al. | 379/221.11 |

* cited by examiner

Primary Examiner—Roland G. Foster

(57) ABSTRACT

A network element, such as a service control point, in a telecommunication network controls the playing of promotional announcements to subscribers and provides for the collection of input from subscribers, such as a DTMF tone, in response to the announcements and action based on subscriber input. Stored subscriber records allow the selection and periodicity of announcements to be customized.

2 Claims, 5 Drawing Sheets

CONTROLLING CUSTOMIZED ANNOUNCEMENTS TO SUBSCRIBERS AND RESPONSES THERETO IN A TELECOMMUNICATION SYSTEM

BACKGROUND OF THE INVENTION

This invention relates to providing announcements to subscribers in a telecommunication system, and more specifically relates to making announcements and collecting subscriber responses under the control of a service control point (SCP) in a telecommunication network.

Automatic call distribution (ACD) systems provide announcements typically as an introductory part of an automated call generation system. After the called party answers, a short prerecorded announcement may be played as a beginning portion of a promotional offer. Following the prerecorded announcement, an ACD agent normally is coupled to the call and seeks to obtain an acceptance of the offer being made. Announcements made by an ACD system are independent of the elements in the telecommunication system that support the calls placed by the ACD system.

Announcements have been made under the control of a service switching point (SSP, also referred to as a switch herein) in existing telecommunication systems. For example, a person placing a telephone call may hear the following announcement upon reaching a number that is not currently in-service: "This number is not in-service, please try your call later." This is an example of a triggering event giving rise to a service-based announcement. Typically such an announcement is generated in response to a telecommunication switch making a determination of a condition for which a predetermined announcement has been deemed desirable.

Promotional announcements are made to subscribers by service providers in an effort to provide extended services that generate additional revenue. Some service providers will provide the following announcement upon a subscriber originating a call to a telephone line that is busy: "If you would like to be automatically connected when your party is free, please press '1'. A service fee of 75 cents will be charged to your account for this service." This is an example of a telecommunication switch causing an announcement to be made and detecting whether or not the subscriber has accepted the offer based on an input, typically a dual tone multifrequency (DTMF) entry from the subscriber.

In the prior two examples, a telecommunication switch provides the intelligence to make the initial determination of whether an announcement was to be made and controls the making of the announcement and collecting input from the subscriber. Although this method has proved serviceable, it has certain disadvantages. If a similar service is offered to a variety of subscribers served by a plurality of different switches, each of the switches has to be provisioned to provide such a service. If a change is desired in the nature of the service once the feature is deployed on the switches, the modification will have to be made at each switch supporting the service. Further, switch-based implementations of promotional offers for various clients become more complex to support where different clients desire different announcements to be made based on an event that is not unique to the client. Therefore, a need exists for an improved method for providing announcements to subscribers and collecting subscriber input in response to the announcements.

SUMMARY OF THE INVENTION

It is an object of the present invention to provide an improved method for controlling announcements in a telecommunication system and monitoring for subscriber response to the announcements that substantially overcomes the above noted shortcomings.

In accordance with an embodiment of the present invention, a method is provided for implementing announcements to subscribers by a service control point in a telecommunication system. A trigger message received at the SCP includes the identity of the first subscriber. The SCP retrieves instructions associated with the first subscriber on playing an announcement. Based on these instructions, the SCP makes a determination of whether the announcement is to be played to the first subscriber. If an announcement is to be played to the first subscriber, a particular announcement is identified and played to the first subscriber. If input from the first subscriber is to be collected, the SCP receives the collected input in response to the playing of the particular announcement.

DESCRIPTION OF EXEMPLARY EMBODIMENTS

Figure 1:
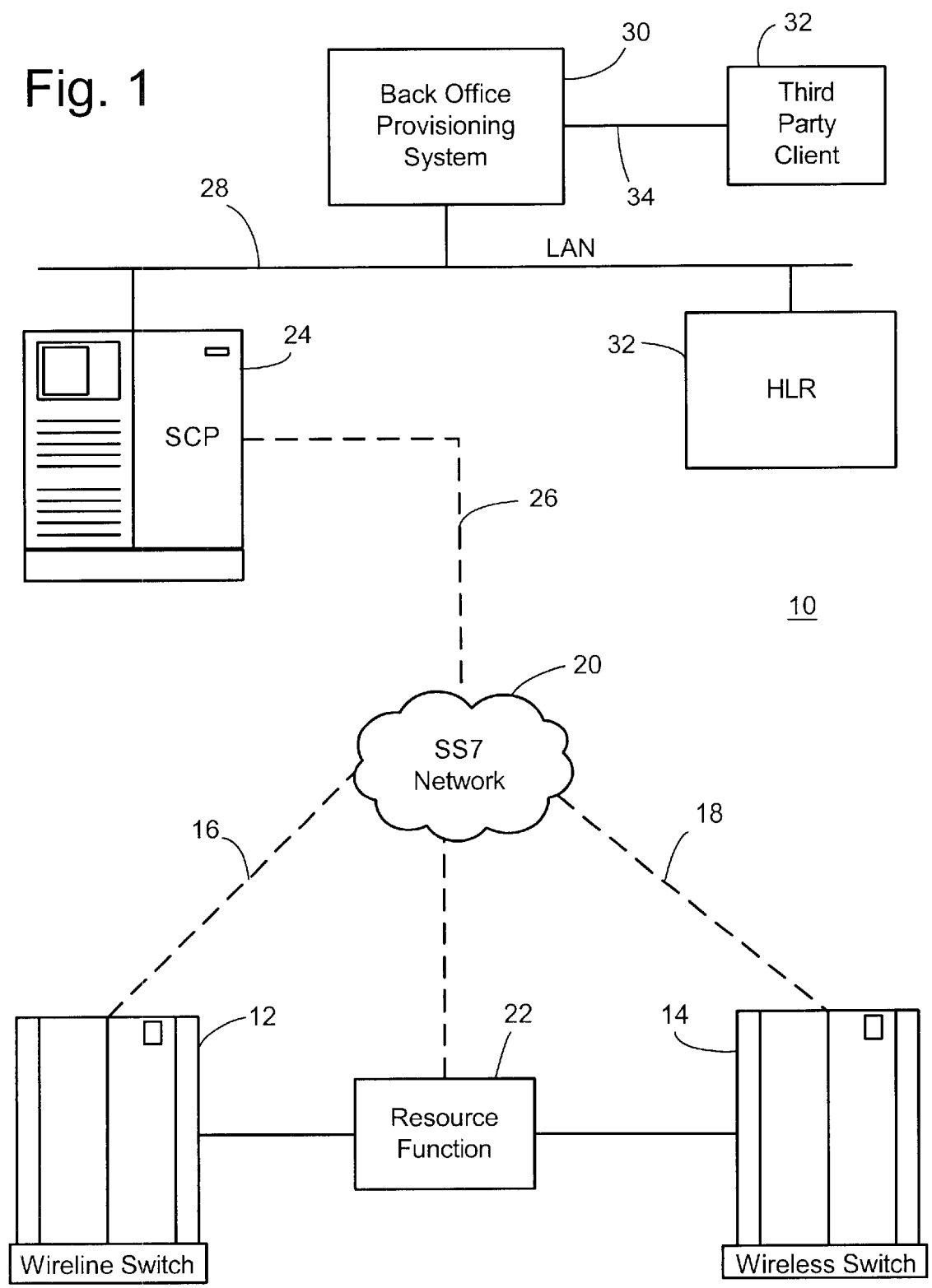
FIG. 1 is a block diagram of an exemplary telecommunication system suited for incorporating an embodiment of the present invention.

FIG. 1 shows an exemplary telecommunication system 10 suited for incorporating an embodiment of the method according to the present invention. A wireline switch 12 and a wireless switch 14 that provide service switching point (SSP) capabilities are coupled by respective signaling communication channels 16 and 18 to the known SS7 network 20. Each of the switches 12 and 14 are also coupled to a resource function 22 such as an external Enhanced Media Resource Server or Service Announcement System integrated in the SSP available from Lucent Technologies Inc. The resource function 22, which is also coupled to SS7 network 20, provides the ability to play announcements including storing a variety of prerecorded announcements, and the ability to detect DTMF tones such as entered by a subscriber as a response to an announcement. The switches 12 and 14 may comprise carrier class switches available from Lucent Technologies Inc.

A service control point 24, such as is available from Lucent Technologies Inc., is connected by signaling communication channel 26 to the SS 7 network 20. The SCP 24 comprises a flexible computer-based platform that can be programmed to provide a variety of functions and services for a telecommunication system. The SCP 24 is also connected by a local area network (LAN) 28 to a back office provisioning system 30 and home location register (HLR) 32 that contains data and records associated with mobile subscribers. The back office provisioning system 30 is typically operated by the telecommunication service provider, such as a local exchange carrier, and is used to provision features and services on the network for clients and subscribers. A third party client 32 may also be provided access to the back office provisioning system 30 by a data channel 34. Alternatively, access can be provided the third party client via a standard interface over the Internet. The third party client 32 may comprise a business or company that subscribes to special services from the telecommunication service provider, and is provided access to the back office provisioning system 30 to accommodate the special services.

Figure 2:
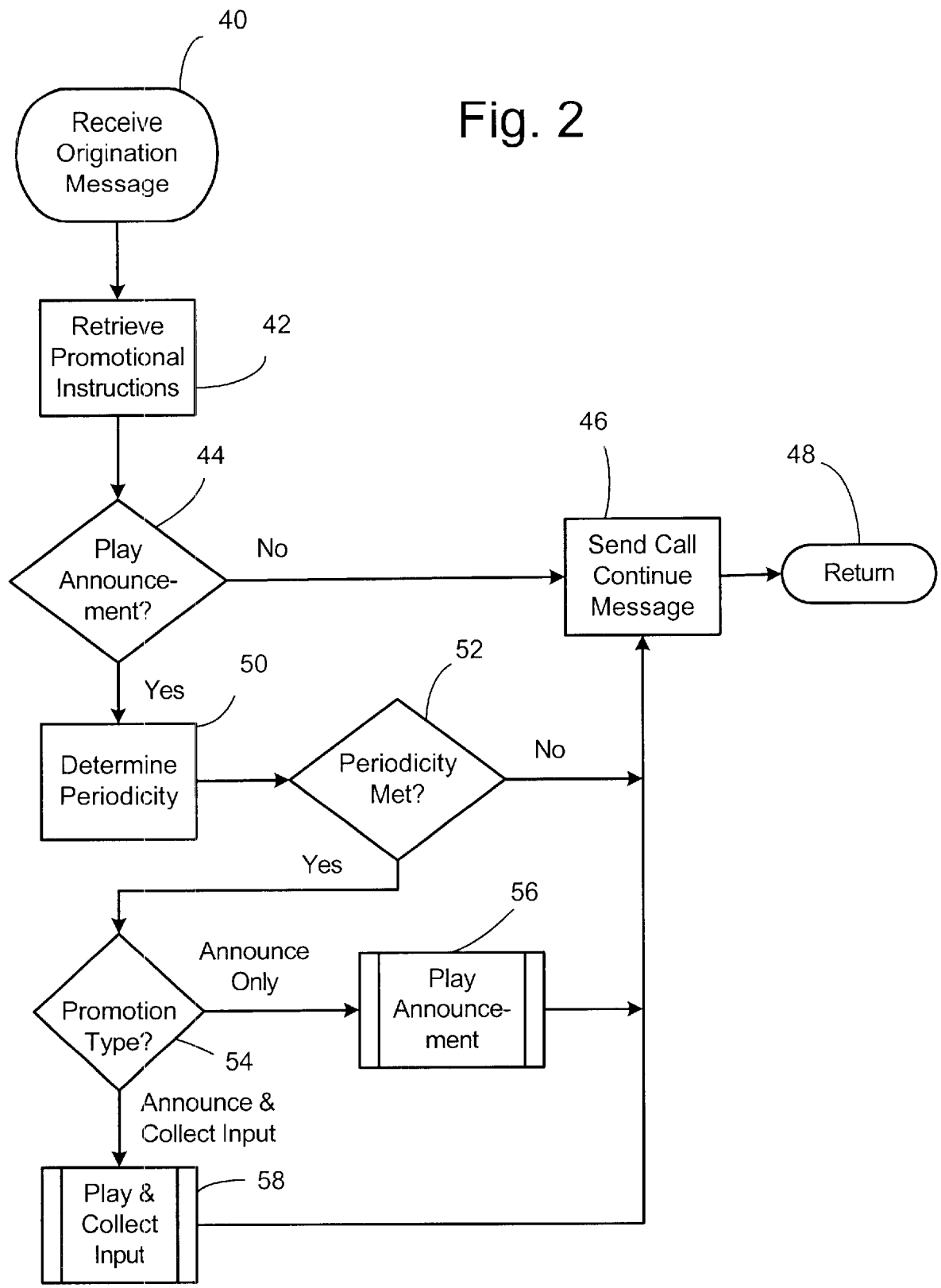
FIG. 2 is a flow diagram of an illustrative method in accordance with the present invention.

FIG. 2 illustrates a flow diagram of an exemplary method in accordance with the present invention. In this exemplary method each call origination by a subscriber provides the event upon which a determination is made of whether an announcement should be played to the subscriber. As will be explained in greater detail, the decision on whether to play announcement may be based on periodicity of the number of times the subscriber has originated call since the last announcement was played. Also, the type of promotion associated with the announcement may require that only the announcement is played to the subscriber, or may seek input from the subscriber in response to the announcement.

The flowchart begins with receiving an origination message at step 40. In accordance with the illustrative method, an origination message is generated upon a request for service by the subscriber by the switch that provides line termination for a subscriber. For example, a subscriber supported by wireline switch 12 would request service by an origination or other triggering event. Upon sensing this condition, switch 12 generates an origination message that is transmitted by the SS 7 network 20 to the SCP 24. This origination message is received at the SCP and begins the process shown in FIG. 2 at step 40. The origination message includes the identity of the subscriber such as the calling line identification and dialed digits. The origination message is an example of a trigger message that can consist of other events or conditions to initiate the processing that controls announcements and input from subscribers in response to the announcements. In step 42 the SCP retrieves instructions relating to a promotional announcement associated with the subscriber. A database either as part of the SCP or as an adjunct to the SCP contains records corresponding to each subscriber. The records are accessed based on the identity of the subscriber and contain information relating to promotional offers. The record preferably contains first data that determines whether an announcement should be played, second data relating to the periodicity or frequency of announcements, and third data that relates to the type of promotion and whether an input from the subscriber is sought, and what to do based on the user input.

In step 44 a decision is made on whether to play an announcement based on the first data contained in the record associated with the subscriber. There are a number of factors or conditions that may cause an announcement not to be played. For example, a service provider may offer subscribers an option to decline in advance all promotional offers. Alternatively, subscribers could be offered the option to decline promotional offers during specified days of the week or time of day, or based on manual input. As an inducement to listen to promotional offers, the service providers or promotional offer clients or the service providers in combination with the promotional offer clients could provide an incentive to subscribers that accept promotional offers. A NO decision by step 44 results in a call continue message being sent in step 46 from the SCP to the originating switch. The call continue message effectively returns call processing and control back to the switch. Following this action, the process terminates at RETURN 48 that ends processing the shown in FIG. 2.

A YES decision by step 44 causes a determination of periodicity to be made at step 50. In accordance with the preferred embodiment of the present invention, periodicity refers to how frequently an announcement is played. For example, a count of the number of call originations by a particular subscriber since the last promotional message was played could be kept as part of the subscriber's record. Alternatively, the elapsed time since the last promotional message was played could be maintained. Further, "periodicity" can include time of day, day of the week, the number dialed, subscriber state (e.g. a new subscriber), subscriber class of service, or a combination of such factors. Following the determination of periodicity in step 50, step 52 makes a decision of whether the periodicity has been met. The periodicity as determined in step 50 is compared to a predetermined criteria or number to make this decision. A NO decision results in a call continue message being sent in step 46 and the process of FIG. 2 ending at RETURN 48.

A YES decision at step 52 results in another decision being made at step 54 of the type of promotion to be played. Depending on the nature of the promotion, some promotions may require only that the announcement be played, that is, no immediate feedback from the subscriber is sought. For example, a public service announcement or other informational announcement may have no need of feedback from a subscriber. An "announce only" decision at step 54 causes activation of the play announcement process 56; this process will be described with regard to FIG. 3. Following the conclusion of the play announcement process 56, the process continues at step 46 with a call continue message being sent from the SCP to the switch, and the process of FIG. 2 ending at RETURN 48. If decision step 54 based on the promotion type requires immediate feedback from the subscriber, the decision at step 54 is "announce & collect input". For example, the promotional offer may involve the payment of additional fees by the subscriber and require authentication from the subscriber to charge the subscriber's account with the service provider. Alternatively, the promotional offer may itself offer choices and hence require an election by the subscriber. Following an "announce & collect input" decision step 54, a corresponding play and collect input process 58 is activated. Following this process which will be described in more detail in FIG. 4, control is passed to step 46 which causes a call continue message to be sent from the SCP to the switch, and processing concludes at RETURN 48. It will be apparent to those skilled in the art that a series of play and collect operations could be implemented depending on the level and type of information sought and the user replies made.

Figure 3:
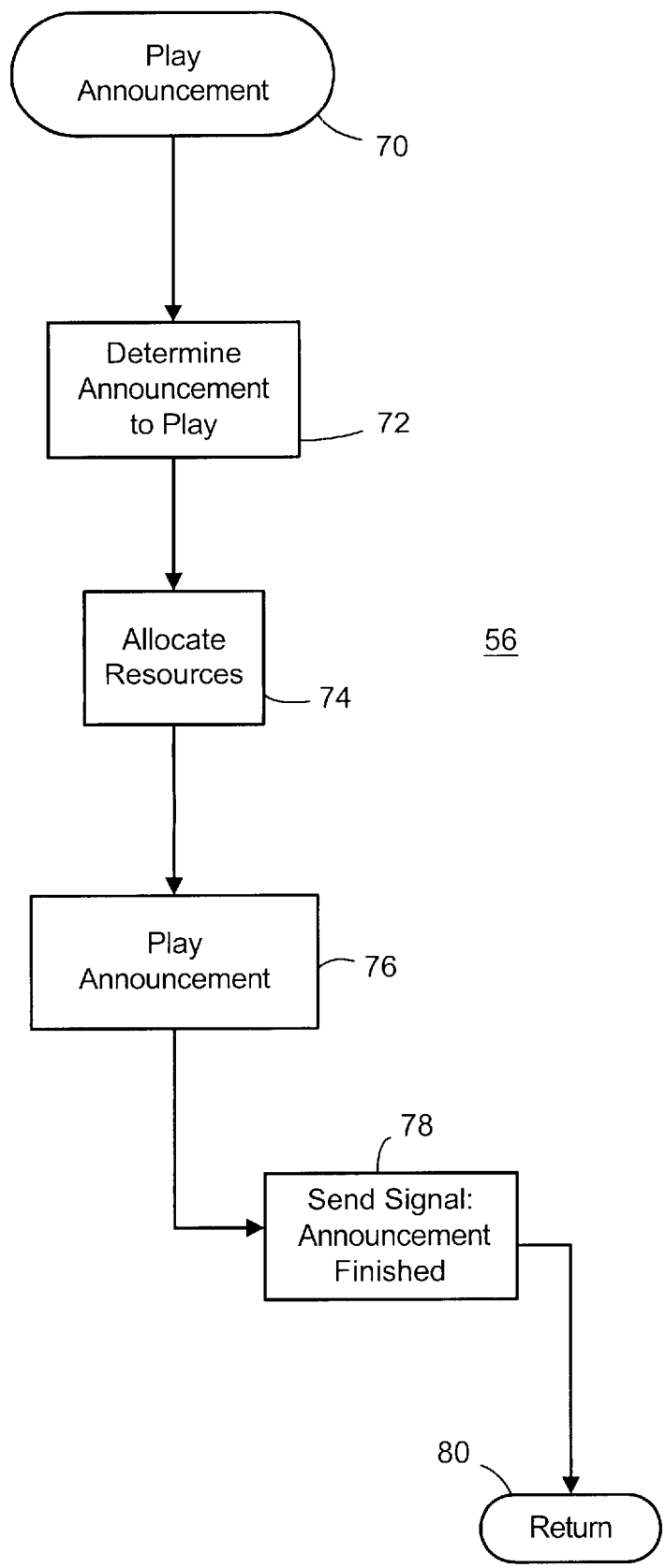
FIG. 3 is a flow diagram illustrating the "play announcement" step of FIG. 2.

Referring to FIG. 3, the play announcement process 56 of FIG. 2 the shown in more detail. The process begins at play announcement step 70. Following the entry to this process, step 72 makes a determination of the announcement to play. A number of techniques can be used to make this determination. For example, a subscriber can be sequenced through a series of different promotional offers. The selection of the promotional announcement could be random among a predetermined set of offers. This determination could also be based on additional information known about the subscriber so as to best match the promotional offer that would be most attractive to the subscriber. Following a determination of the announcement to play at step 72, step 74 allocates resources required to make the announcement. As an example of such an allocation, SCP 24 can send a resource allocation message via the SS 7 network and terminating switch 12 to resource function 22 which stores all of the promotional announcements and has the needed audio resources to play a selected announcement to the subscriber's line connected through switch 12. The resource allocation message causes the resource function 22 to allocate the needed resources and couples the resources to the subscriber's line. Following step 74, play announcement step 76 is executed. In this step the SCP generates a play announcement message that is transmitted to the resource function 22. The play announcement message contains information specifying the specific stored announcement at the resource function to be played, and causes playing of the announcement to be initiated. If desired, steps 74 and 76 could be implemented in an integrated process to provide the functions. Following step 76, step 78 sends a signal to the node in control, i.e. SCP 24, indicating that the announcement has been completed prior to the RETURN at step 80 causing the processing to return to step 46 in FIG. 2.

Figure 4:
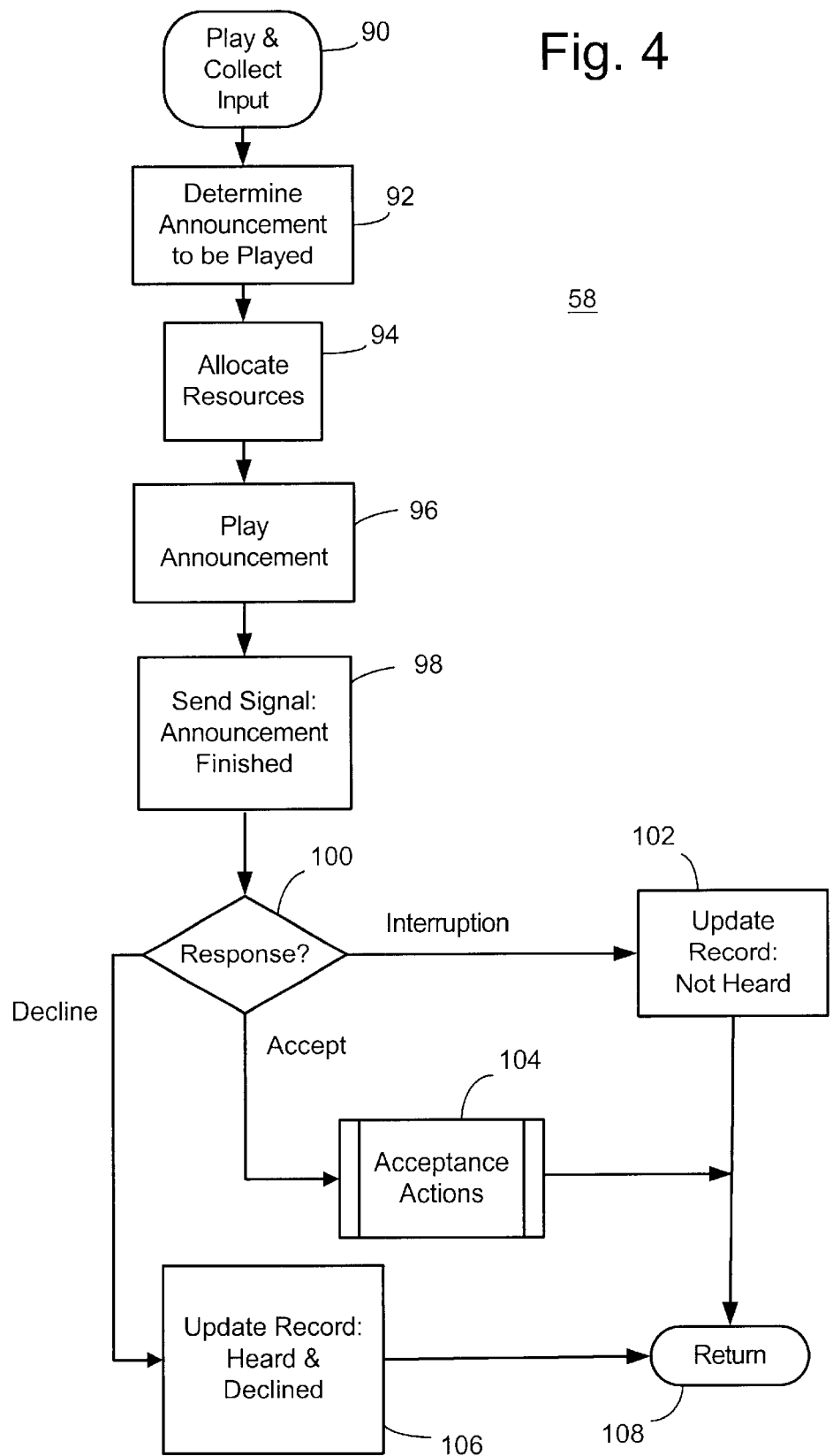
FIG. 4 is a flow diagram illustrating the "play and collect input" step of FIG. 2.

FIG. 4 provides a more detailed description of the play and collect input step 58 of FIG. 2. This play and collect input process begins at step 90. Steps 92, 94, 96 and 98 are substantially identical to steps 72, 74, 76 and 78, and hence will not be further described except to note differences. The allocate resources step 94, in addition to readying the resource function 22 to play an announcement, also causes the resource function 22 to allocate a digit receiver function to collect DTMF inputs from the subscriber. Any DTMF inputs from the subscriber are detected and converted into a message transmitted to the SCP. Assuming the service provider authorizes the recognition of an input from the subscriber prior to the completion of the playing of the announcement, the subscriber can provide a response prior to the completion of the announcement. For example, subscribers taking part in the promotional offers could be provided with the opportunity to elect an early termination of the announcement such as by transmitting a DTMF "#". Such a response would be recognized as an interruption by subscriber response decision step 100. This action would cause the subscriber's record to be updated to reflect the announcement not being heard at step 102. Depending upon the service provider's implementation, the subscriber's record could reflect that the announcement was not heard or could reflect that a specific announcement was not heard due to early termination by the subscriber. The fact that a specific announcement was not heard could be utilized in making future decisions concerning announcements to be played to the particular subscriber. If user input is decided at step 100 to constitute an acceptance of the promotional offer, step 104 causes acceptance actions to be implemented. These actions will be described in further detail with regard to FIG. 5. If user input is decided at step 100 to constitute a decline or negative response to the promotional offer, step 106 causes the subscriber's record to be updated as the specific promotional offer having been heard and declined. The processing as shown in FIG. 4 concludes at RETURN 108. The resource function 22 detects the DTMF inputs from the subscriber and transmits a corresponding message containing the decoded information to the SCP for further processing. It will be understood that FIG. 4 is exemplary and that a plurality of announcements and corresponding inputs from a subscriber can be collected.

Figure 5:
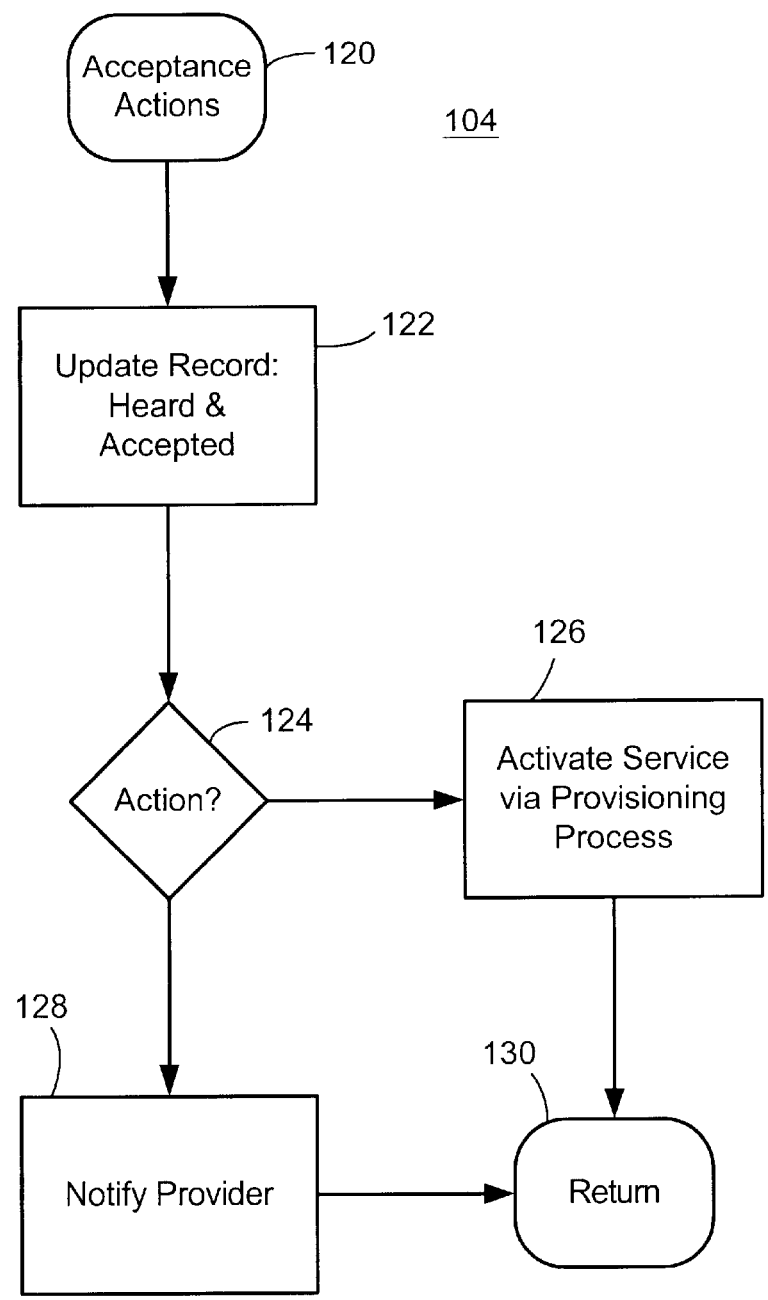
FIG. 5 is a flow diagram illustrating the "acceptance actions" step of FIG. 4.

FIG. 5 provides a more detailed description of the acceptance actions of step 104 in FIG. 4. Starting at acceptance actions beginning 120, the subscriber's record is updated with the specific promotional offer having been heard and accepted at step 122. This information is made available to the SCP by the transmission of a corresponding message from the resource function 22 that decodes the subscriber input, e.g. determines the DTMF digits input by the subscriber, that reflects acceptance of the offer. In step 124 a decision is made as to the appropriate action to be taken based on the acceptance of the offer by the subscriber. Based on the nature of the specific promotional offer, either immediate or deferred action based on the acceptance should be taken. If the decision by step 124 based on the particular offer is that immediate action is to be taken, step 126 provides immediate processing. More specifically, the subscriber may have elected to activate an additional service or feature that can be provisioned automatically in substantially real-time. For example, real-time activations could include Calling Name, Voicemail, multimedia messaging services, text message services (horoscope, joke of the day, weather, traffic, stock quotes,), special price plans, voice activated dialing, etc. If the decision by step 124 based on the particular offer is that deferred action is appropriate, step 128 causes the service provider to be notified of the acceptance by the subscriber. Depending on the nature of the offer and the timeliness of responding to an acceptance of the offer, the service provider can be transmitted a message advising of the acceptance by the specific subscriber, or a list of acceptances by subscribers can be compiled and transmitted to the service provider at a time interval determined by the service provider. The process of FIG. 5 concludes at RETURN 130.

The illustrative method in accordance with the present invention can be used in a variety of applications. It will be apparent that telecommunication service providers and companies offering adjunct services over the telecommunication network can advantageously use promotional advertising in accordance with the present method. As an inducement to subscribers to listen to the promotional announcements, the service provider could offer a reduced fee or rate for telecommunication services if the subscriber agrees to listen to the promotional advertising. A service provider could advertise new services targeted at specific classes of subscribers. The following announcements illustrate such usage.

A. "Because you are a high usage subscriber, we are offering you reduced rates for specific types of calls or a new mobile phone as thanks for being a valued customer."

B. "Since you call specific numbers frequently, we would like to offer you one month of our speed calling services for free so that you can experience its convenience."

Basic advertising for retail products or services can also be implemented using the present method. For example, flower shops, coffee shops, and others could utilize promotional announcements with or without seeking input from the subscriber.

Although an embodiment of the method in accordance with the present invention has been described, it will be apparent to those skilled of the art that various modifications can be made. The scope of the invention is not intended to be limited to only the specific examples described above, but is intended to be defined by the claims that follow.

What is claimed is:

1. A method implemented by a service control point (SCP) in a telecommunication system for controlling advertising announcements to subscribers comprising the steps of:

receiving, at the SCP, a trigger message including the identity of a first subscriber;

retrieving, at the SCP, instructions associated with the first subscriber on playing an announcement, said retrieving step including identifying a record in a database associated with the SCP based on the identity of the first subscriber, and accessing data stored in the record containing information about previous advertising announcements played to the first subscriber;

determining, by the SCP based on said instructions, whether an announcement is to be played to the first subscriber;

if an announcement is to be played to the first subscriber, identifying at the SCP a particular announcement from a plurality of possible announcements to be played based on the previous advertising announcements played to the first subscriber and causing the particular announcement to be played to the first subscriber;

the accessing step including determining whether a periodicity factor has been met wherein the periodicity factor comprises a count of the number of times the first subscriber has originated communications since the last announcement was played to the first subscriber.

2. A method implemented by a service control point (SCP) in a telecommunication system for controlling advertising announcements to subscribers comprising the steps of:

receiving, at the SCP, a trigger message including the identity of a first subscriber;

retrieving, at the SCP, instructions associated with the first subscriber on playing an announcement;

determining, by the SCP based on said instructions, whether an advertising announcement is to be played to the first subscriber;

if an advertising announcement is to be played to the first subscriber, identifying at the SCP a particular advertising announcement from a plurality of possible advertising announcements to be played and causing the particular advertising announcement to be played to the first subscriber;

generating, at the SCP, an action message that is sent to a provider of a service associated with the particular advertising announcement, the generation of the action message being dependent on input collected from the first subscriber;

the determining step including determining whether a periodicity factor has been met wherein the periodicity factor comprises a count of the number of times the first subscriber has originated communications since the last announcement was played to the first subscriber.

* * * * *